United States Patent
Cunningham et al.

[19]

[11] Patent Number: 6,064,786

[45] Date of Patent: *May 16, 2000

[54] MULTIMODE COMMUNICATIONS SYSTEMS AND METHOD USING SAME

[75] Inventors: David George Cunningham, Wickwar; Lutz Raddatz, Bristol; Ian White, Bath; Mark Charles Nowell, Bristol, all of United Kingdom

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,993

[22] PCT Filed: Mar. 10, 1997

[86] PCT No.: PCT/GB97/00647

§ 371 Date: Nov. 6, 1997

§ 102(e) Date: Nov. 6, 1997

[87] PCT Pub. No.: WO97/33390

PCT Pub. Date: Sep. 12, 1997

[30] Foreign Application Priority Data

Mar. 8, 1996 [GB] United Kingdom .................... 9605011

[51] Int. Cl.$^7$ .................. G02B 6/26; G02F 1/00
[52] U.S. Cl. .................. 385/38; 383/27; 383/28; 383/31; 359/109; 359/116
[58] Field of Search ................ 385/27, 28, 29, 385/30, 31, 38, 39, 55, 56; 359/109, 116

[56] References Cited

U.S. PATENT DOCUMENTS

| | | | |
|---|---|---|---|
| 4,050,782 | 9/1977 | Uchida et al. | 385/28 X |
| 4,053,764 | 10/1977 | Sierak et al. | 385/28 X |
| 4,067,642 | 1/1978 | King et al. | 385/28 |
| 4,118,100 | 10/1978 | Goell, et al. | 385/88 X |
| 5,077,815 | 12/1991 | Yoshizawa et al. | 385/28 |
| 5,113,244 | 5/1992 | Curran | 385/24 |

(List continued on next page.)

FOREIGN PATENT DOCUMENTS

| | | | |
|---|---|---|---|
| 0 224 282 A1 | 6/1987 | European Pat. Off. | 385/88 X |
| 0 361 498 | 4/1990 | European Pat. Off. | 385/28 X |
| 0 603 042 A1 | 6/1994 | European Pat. Off. | 385/88 X |
| 2 368 725 | 5/1978 | France | 385/28 X |
| 2 061 547 | 5/1981 | United Kingdom | 385/28 X |
| 2 172 765 | 9/1986 | United Kingdom | 385/28 X |
| 82 02956 | 9/1982 | WIPO | 385/28 X |
| WO 98/52303 | 11/1998 | WIPO | 385/53 X |

OTHER PUBLICATIONS

R.J.S. Bates et al. "Improved multimode fiber link BER calculations due to modal noise and non–self–pulsating laser diodes". *Optical and Quantum Electronics* 27(1995) 203–224. Tutorial Review.

(List continued on next page.)

*Primary Examiner*—Brian Healy
*Attorney, Agent, or Firm*—Ladas & Parry

[57] ABSTRACT

A method and apparatus for increasing the operational bandwidth of a multimode optical fiber communications system is provided. The method comprises launching optical radiation into the core of the multimode fiber away from the center of the core so as to strongly excite mid order modes of the multimode fiber, but to only weakly excite low order and high order modes of the multimode fiber. The mid order modes excited are predominately within a small number of mode groups and thus have similar propagation constants. This leads to a reduction in modal dispersion and thus to a significant increase in bandwidth compared to an overfilled launch. The offset launch of the invention is tolerant both to the launch conditions and to any imperfections in the fiber refractive index profile. Modal noise performance is also enhanced. Embodiments of the invention employ a singlemode fiber, a multimode fiber or a lens to illuminate an end face of a multimode fiber with a small spot offset from the optical axis of the fiber.

14 Claims, 20 Drawing Sheets

U.S. PATENT DOCUMENTS

| | | | |
|---|---|---|---|
| 5,138,675 | 8/1992 | Schofield | 385/28 |
| 5,200,795 | 4/1993 | Kim et al. | 356/345 |
| 5,337,380 | 8/1994 | Darbon, et al. | 385/28 |
| 5,416,862 | 5/1995 | Haas et al. | 385/28 |
| 5,600,470 | 2/1997 | Walsh | 359/152 |
| 5,796,891 | 8/1998 | Poustie et al. | 385/28 |
| 5,799,119 | 8/1998 | Rolland et al. | 385/28 |

OTHER PUBLICATIONS

Koh–Ichi Suto et al. "Dependence of Error Rate Degradation on Graded–Index–Fiber Excitation State". *Journal of Lightwave Technology*, vol. LT–3, No. 6, Dec. 1985. 1324–1331.

Katsuya Yamashita et al. "Launching Condition Dependence of Bandwidth in Graded–Index Multimode Fibers Fabricated by MCVD or VAD Method". *Journal of Lightwave Technology*, vol. LT–3, No. 3, Jun. 1985. 601–607.

John E. Midwinter "Optical Fibers for Transmission". *Wiley Series in Pure and Applied Optics* (no date of publication).

Hitachi, Ltd. "Improvements in Optical Coupling Devices," United Kingdom Patent Specification No. 1 567 701 (patent appln No. 47120/77), May 21, 1980.

Showa Electric Wire & Cable Co Ltd., "Two–way Transmission System of Optical Fiber," EPO Patent Abstract Publication No. 60075137, Apr.27, 1985.

x = 0.50 thousandths of inch (12.7μm) x/R=0.4064

500ps/div
500mV/div

4ns/div
500mV/div x = 0.75 thousandths of inch (19.06μm) x/R=0.6096

500ps/div
200mV/div

4ns/div
500mV/div x = 1.0 thousandths of inch (25.41μm) x/R=0.8132

4ns/div
100mV/div 1300 nm LED centre launch
100 Mb/s
2ns/div 200mV/div

200 Mb/s
2ns/div 200mV/div

1300nm Fabry-Perot centre launch

1300nm Fabry-Perot offset launch

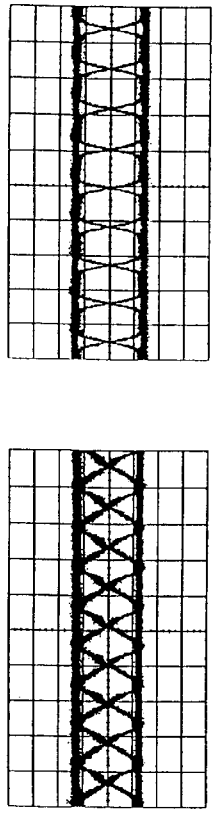
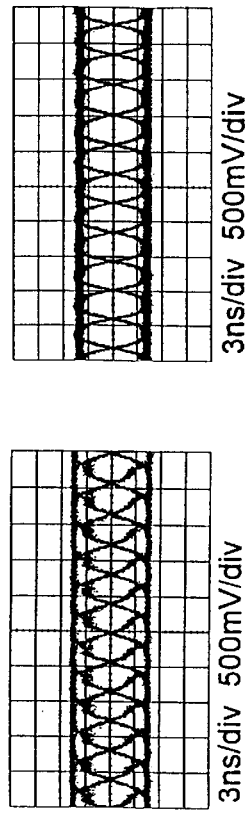
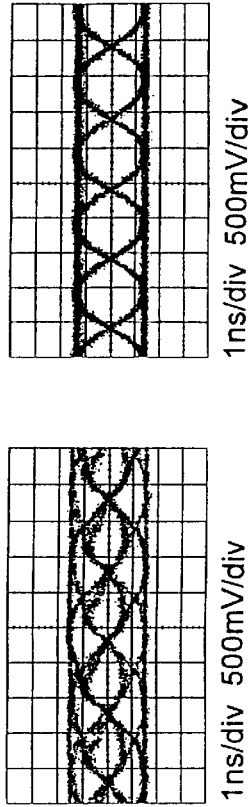
Fig. 12C 300 Mb/s
Fig. 12D 400 Mb/s
Fig. 12E 500 Mb/s

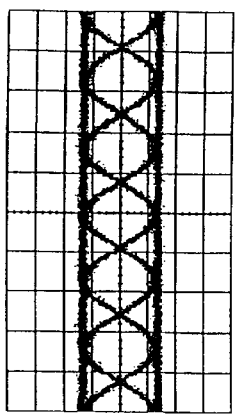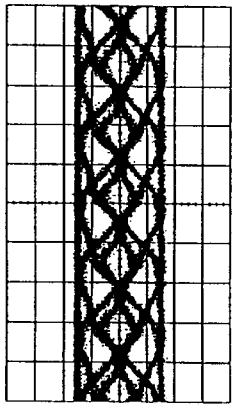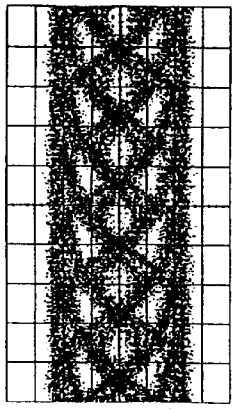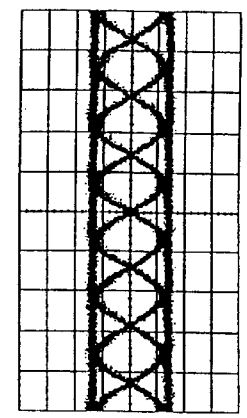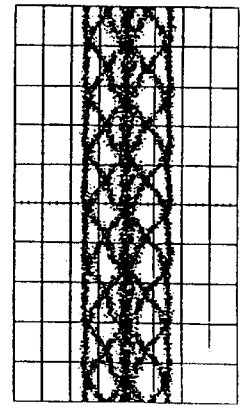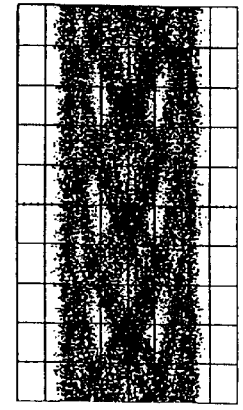
Fig. 12F
Fig. 12G back-back (2 GBit/s)

after 1 km MMF
(2 GBit/, edge launch)

after 2 km MMF
(2 GBit/s, edge launch)

after 2 km MMF
(500 MBit/s, centre launch)

Performance of MMF link back-back 2 km MMF, best launch (2 km)

2 km MMF, worst launch (2 km)

MMF output with single transverse mode VCSEL as source, 1 Gbit/s

MULTIMODE COMMUNICATIONS SYSTEMS AND METHOD USING SAME

BACKGROUND OF THE INVENTION

The present invention relates to methods and apparatus for improving the performance of multimode optical fibre communications systems, and in particular to methods and apparatus for launching optical radiation into multimode fibre.

In the late 1970s, and early 1980s, much work was carried out to improve performance of multimode optical fibre communications systems. However, when multimode fibre was replaced by a singlemode fibre, as the medium of choice for use in high bit rate, long distance communications systems, much of this work ceased. Multimode fibre has continued to be used in optical communications for systems operating at lower bit rates, and over shorter distances, for example in building or campus LANs. There is thus a large installed base of multimode fibre, which represents a significant investment.

In recent years the demand for high data rate LANs has increased dramatically, for example to 1 GBit/s and beyond. Thus, even though multimode optical fibre is only utilised over short distances, for example 500 meters, the required data rates cannot be achieved utilising conventional techniques.

A key aspect in determining the bandwidth of a multimode optical fibre communications link, which has been recognised for many years, is the number and distribution of modes within the multimode fibre which are excited, and therefore carry optical energy. See for example Chapter 7 of "Optical Fibres for Transmission" by John E. Midwinter, published by John Wiley & Sons in 1979. If a pure low order singlemode is launched into a multimode fibre, and there is no mode mixing, the bandwidth and other characteristics of the optical communication link will be that of a single-mode fibre, i.e. the link will have high bandwidth. If mode mixing occurs, for example due to fibre profile irregularities, or mechanical perturbations of the fibre, energy will be coupled from the single lowest order mode into higher order modes having lower group velocities, and additional pulse dispersion will inevitably result, leading to a lower overall bandwidth for the communications system. Alternatively, if light is launched into the same multimode fibre in a manner so as to uniformly excite all modes of the multimode fibre (a so called "overfilled launch"), and if no mode mixing occurs, a maximum pulse spread will be seen, and the bandwidth of the communications system will be at a minimum. If mode mixing is introduced to this situation, because individual photons will then spend some time in many different modes, and will have travelled many short distances at different group velocities, less pulse spreading will be experienced. In the ideal case rather than experiencing an increase of pulse spreading which is proportional to the length of the optical communications link, pulse spreading builds up only in proportion of the square root of the length of the optical communications link. Thus, in the early 1980s, although various alternative schemes were investigated (see eg U.S. Pat. Nos. 4,050,782 and 4,067,642), it was generally accepted that it was desirable to launch many modes into a multimode optical fibre, and to ensure that adequate mode mixing occurred in order to achieve a reasonable, and predictable, bandwidth for an optical communications link.

Despite this practical approach, it was however theoretically predicted that if the number and distribution of modes excited within a multimode fibre could be precisely controlled, the bandwidth of the communications link could be improved. For example, see Section 7.6, page 126 of Midwinter's book where it is suggested that controlled mode coupling can be utilised to prevent coupling to the highest order modes of the fibre so as to increase the fibre bandwidth without incurring a loss penalty. Nevertheless, it is stated here that "It must be said, however that experimentally it looks extremely difficult to achieve such a precisely controlled fibre environment, and at the time of writing no reports of experimental testing are known."

In recent years lasers rather than LEDs (Light Emitting Diodes) have been utilised with multimode optical fibre communications systems. There are a number of reasons for this, firstly, lasers can be directly modulated at higher speeds than LEDs. Secondly, because lasers have only a few, well controlled, transverse modes they can be utilised to excite only a selected few modes of the multimode optical fibre. The aim has been to alter the launch conditions so as to increase the bandwidth of the multimode fibre beyond its OFL (overfilled launch) bandwidth. The OFL, conditions are specified in an EIA/TIA standard (EIA/TIA 455–54A "Mode scrambler requirements for overfilled launching conditions to multimode fibers") and are designed to ensure that all modes of the multimode fibre are uniformly exited. While an OFL launch ensures a certain minimum bandwidth, this worst case bandwidth is no longer sufficient and there is a requirement to reliably improve the bandwidth that can be guaranteed to be achievable for any multimode fibre system.

It is known to utilise a laser to launch a small exciting spot of radiation at the centre of a multimode fibre, for example by employing a singlemode fibre, or a lens between the laser source and the multimode fibre. The aim of such a "centre launch", as it will be termed herein, is to excite only the lowest order mode (or at the most a few low order modes) of the multimode fibre. As discussed above, if only a few modes of a multimode fibre are excited, and little mode mixing occurs, the bandwidth of a multimode optical fibre communications system can theoretically be increased dramatically since modal dispersion is effectively eliminated. However, there are several disadvantages to the use of a centre launch to increase the bandwidth of multimode communications systems. Tight tolerances on the position and size of the exciting spot are required to ensure the launch of only a single mode or a few low order modes. Secondly, as discussed above, if mode mixing or coupling occurs due to the fibre environment or at connectors within the communications system, many more modes will be excited despite the use of a centre launch. Thirdly, the centre launch technique is sensitive to defects in the multimode fibre refractive index profile and particularly sensitive to any "central dip" in the profile. Such a central dip can occur for example due to the evaporation of dopant from the inner surface of a fibre preform when the preform is collapsed during the fabrication of the fibre. Finally, the use of a laser to launch a small number of low order modes into a multimode fibre is known to give rise to modal noise. The modal noise problems experienced when using high coherence sources with multimode fibres are exacerbated when only a few modes of the multimode fibre are excited. Modal noise problems have received much recent attention, see for example "Improved Multimode Fibre Link BER Calculations Due To Modal Noise and Non-Self Pulsating Laser Diodes" R. J. S. Bates et al, Optical and Quantum Electronics 27 (1995) 203–224.

U.S. Pat. No. 5,416,862 discloses the use of singlemode fibre whose longitudinal axis is tilted at a predetermined angle to the longitudinal axis of a multimode fibre to launch a small number of higher order modes into the multimode fibre. While this angled launch is said to reduce modal dispersion (and thus increase bandwidth) and to reduce sensitivity to mechanical perturbations, the excitation of only higher order modes causes a considerable loss of optical power.

SUMMARY OF THE INVENTION

According to a first aspect of the present invention there is provided a method of increasing the operational bandwidth of a multimode optical fibre communications system, the method comprising launching optical radiation into the core of the multimode fibre away from the centre of the core so as to strongly excite mid order modes of the multimode fibre, but to only weakly excite low order and high order modes of the multimode fibre. The present Applicants have discovered that by launching radiation into the core of a multimode fibre a predetermined radial distance from the centre of the multimode fibre a number of mid order modes can be reliably excited. The mid order modes excited are predominately within a small number of mode groups and thus have similar propagation constants. This leads to a reduction in modal dispersion and thus to a significant increase in bandwidth compared to an overfilled launch. Furthermore this "offset launch", as it will be termed herein, is tolerant both to the launch conditions and to any imperfections in the fibre refractive index profile, i.e. similar mode profiles are excited in the multimode fibre despite variations in launch conditions and despite a central dip in the fibre refractive index profile. Indeed, consistently greater bandwidth enhancement has been observed when utilising an offset launch compared to a centre launch despite theoretical predictions that the centre launch should yield the greater bandwidth enhancement. This is believed to be due to fibre refractive index profile defects. It has also been found that an offset launch suffers from less optical power loss than prior art angled launch techniques.

According to a second aspect of the present invention there is provided a method of decreasing modal noise experienced in a multimode optical fibre communications system employing a laser source, the method comprising launching optical radiation into the core of the multimode fibre by illuminating an end face of the multimode fibre with a spot of optical radiation offset from the longitudinal axis of the multimode fibre, so as to excite a plurality of modes of the multimode fibre, but relatively few low order modes of the multimode fibre. When a laser source is employed, the Applicants have found that an offset launch reduces the level of modal noise compared to that experienced in a multimode communications system utilising a centre launch. This is thought to be because modal noise in a multimode optical fibre communications system is generally inversely proportional to the number of modes excited within the multimode fibre.

Embodiments of the present invention thus enable a simultaneous enhancement of both the bandwidth and modal noise performance of a multimode optical fibre communications system relative to an overfilled launch and often also relative to a centre launch.

According to a third aspect of the present invention there is provided a transmitter for use in a multimode fibre communications system, the transmitter comprising an optical source, and collecting means for collecting optical radiation output from the optical source and directing it to an end face of the multimode optical fibre, wherein the collecting means is adapted to direct optical radiation onto the core of the multimode fibre substantially away from the optical axis of the multimode fibre so as to increase the operational bandwidth of the multimode fibre communications system.

According to one embodiment of the present invention the collecting means comprises a single mode optical fibre, one end of which is aligned to receive light from the optical source, the other end of which is aligned to launch optical radiation into the core of the multimode fibre of a multimode fibre communications system. Surprisingly, it has been found that when the ends of the single mode and multimode fibre are butted together, but axially mis-aligned, the bandwidth of the multimode fibre communications system is often greater than when the singlemode and multimode fibres are axially aligned.

Alternatively, the connecting means comprises a lens, aligned to receive optical radiation from the optical source, and to direct a spot of optical radiation onto the core of the multimode fibre substantially away from the optical axis of the fibre.

For both embodiments of the present invention, comprising the singlemode fibre, and the lens, advantageously the spot size of the optical radiation directed onto the core of the multimode fibre is substantially smaller than the core of the multimode fibre, preferably the radius of the spot is less than half the radius of the core.

Preferably the distance of the centre of the spot from the centre of the core, x, is a substantial fraction of the radius of the core R. Advantageously $x/R$ is between 0.1 and 0.9, preferably $x/R$ is between 0.5 and 0.7.

The spot of optical radiation may for example be in the form of an annulus substantially equidistant from the optical axis of the multimode fibre, but is preferably of a substantially circular form.

BRIEF DESCRIPTION OF THE DRAWINGS

Specific embodiments of the present invention will now be described, by way of example only, and with reference to the following drawings, in which:

FIGS. 12a–g shows experimental results comparing embodiments of the present invention to results achievable with prior art techniques.

DETAILED DESCRIPTION OF THE INVENTION

Although a full theoretical understanding of the mechanisms on which the present invention are based has not as yet been achieved, the Applicants have developed a theoretical model which gives some insight and facilitates enablement of embodiments of the present invention. It will be appreciated that the present invention is not limited in any way by this theoretical model. The theoretical model is described in detail in the Appendix at the end of the present specification, however some results of this modelling will now be given.

Figure 1:
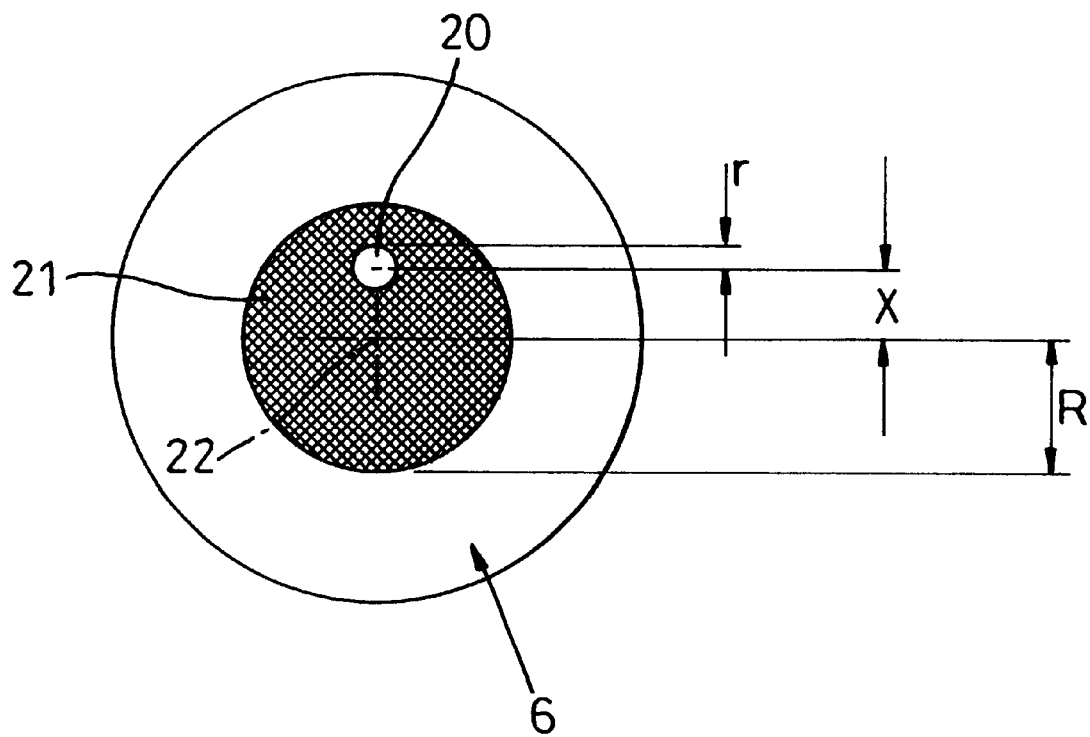
FIG. 1 shows shows a spot illuminating a multimode fibre core in accordance with embodiments of the present invention.

FIG. 1 shows the geometry of an illuminating spot 20 offset (a distance X), in accordance to embodiments of the present invention, from the optical axis 22 of a multimode fibre optical 6. The illuminated spot 20 has a radius r and the multimode fibre 6 has a core 21 of radius R.

Figure 2:
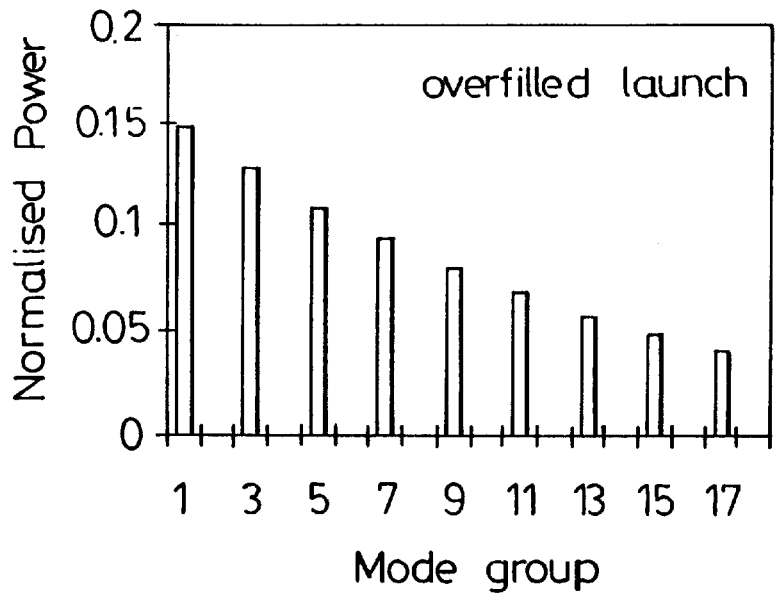
FIG. 2 is theoretical plot of the normalised mode excitation spectrum for a multimode fibre when excited by an overfilled launch.

FIG. 2, 3a and 3b are theoretical plots of the normalised mode excitation spectra for an overfilled launch (FIG. 2), an offset launch (FIG. 3a), and an angled launch (FIG. 3b) into a multimode fibre. The multimode fibre is modelled to have a core of 62.5 μm diameter and a cladding of 125 μm diameter and the operating wavelength is 1300 nm. For the offset launch the illuminating spot is of radius 5 μm (standard for singlemode fibre at 1300 nm) and is offset a distance X=18 μm from the multimode fibre axis 22. The angled launch has been optimised as far as is possible. As can be seen from these figures, the mode excitation spectra of these three types of launch are very different. The OFL shows the expected excitation of a large number of modes including the strong excitation of lower order modes. The angled launch, as disclosed in U.S. Pat. No. 5,416,862, shows strong excitation of the higher order modes and very little excitation of the lower order modes. Furthermore the mode excitation profile is relatively flat. The offset launch in contrast shows the strong excitation of a small mid order group of modes that is believed to lead to high bandwidth and good modal noise performance. At centre launch would excite only the first or perhaps first and second order modes.

Figure 3:
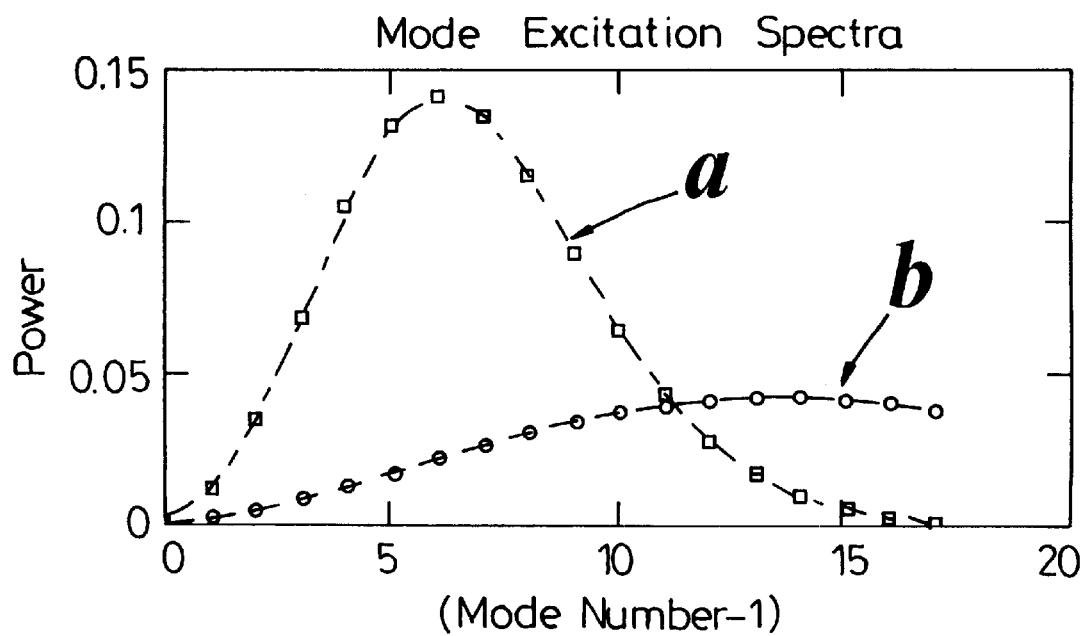
FIG. 3 is respectively theoretical plots of the normalised mode excitation spectrum for a multimode fibre when excited by an offset launch and by an angled launch.
Figure 4:
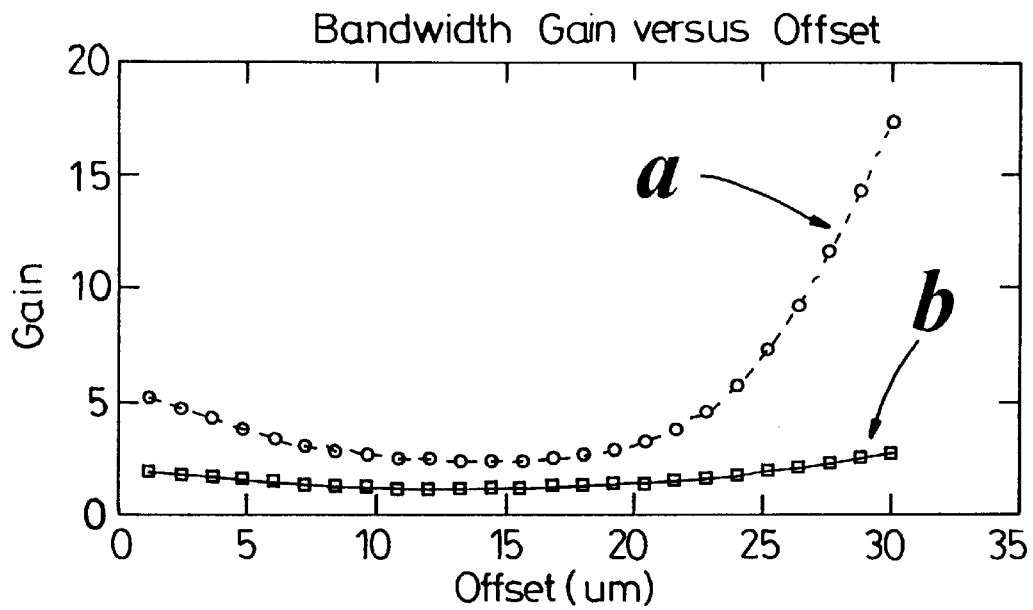
FIG. 4 is respectively theoretical plots of the bandwidth gain, compared to an overfilled launch, of an offset launch and an angled launch for various offsets and angles.

FIG. 4 shows the bandwidth gain for the angled launch (FIG. 4b) and the offset launch (FIG. 4a) of FIG. 3. The bandwidth gain is calculated as a multiple of the bandwidth for an OFL. Both launches show increased bandwidth compared to OFL but the offset launch has a significantly greater bandwidth improvement.

Figure 5:
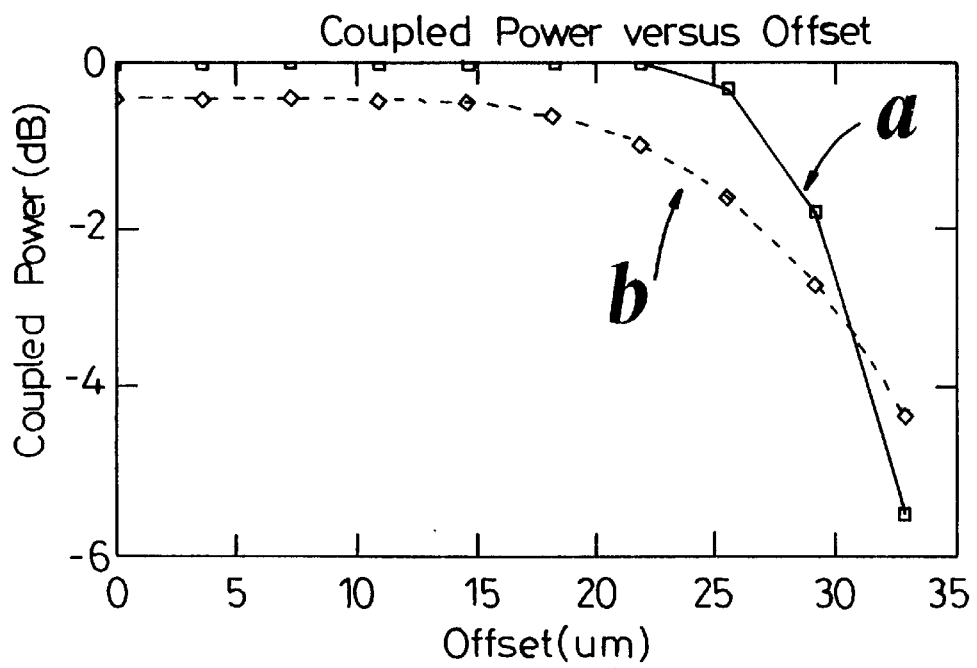
FIG. 5 is respectively theoretical plots of the power coupled into a multimode fibre from an offset launch and an angled launch for various offsets and angles.

FIG. 5 is a graph of the power coupled to the multimode fibre from the singlemode launch fibre for the angled launch FIG. 5b) and the offset launch (FIG. 5a). From FIGS. 4 and 5 it can be seen that for these particular operating conditions there is a range of offsets from between 15 and 25 μm which give both high bandwidth gain and low loss for the offset launch. However, for the angled launch in order to achieve significant bandwidth gains an operating range of high coupling loss must be entered. In should be noted that angles have been converted to equivalent offsets for the angled launch in FIGS. 4 and 5 in order to compare the two launch techniques.

Furthermore it can be seen from FIGS. 4 and 5 that there is a wide range of offsets that achieve these advantages and thus that, compared to a centre launch, significantly lower tolerances are required.

As described at the end of the theoretical appendix to the present specification, the refractive index profiles of graded index multimode fibres vary, thus any modelling must address these variations. It is believed that currently available graded index multimode fibres have a variation of the index of the power law, g, of between 2.2 and 1.8, thus fibres having g within this range, and Δ=0.01345 and $n_1$=1.5 have been modelled.

Figure 6:
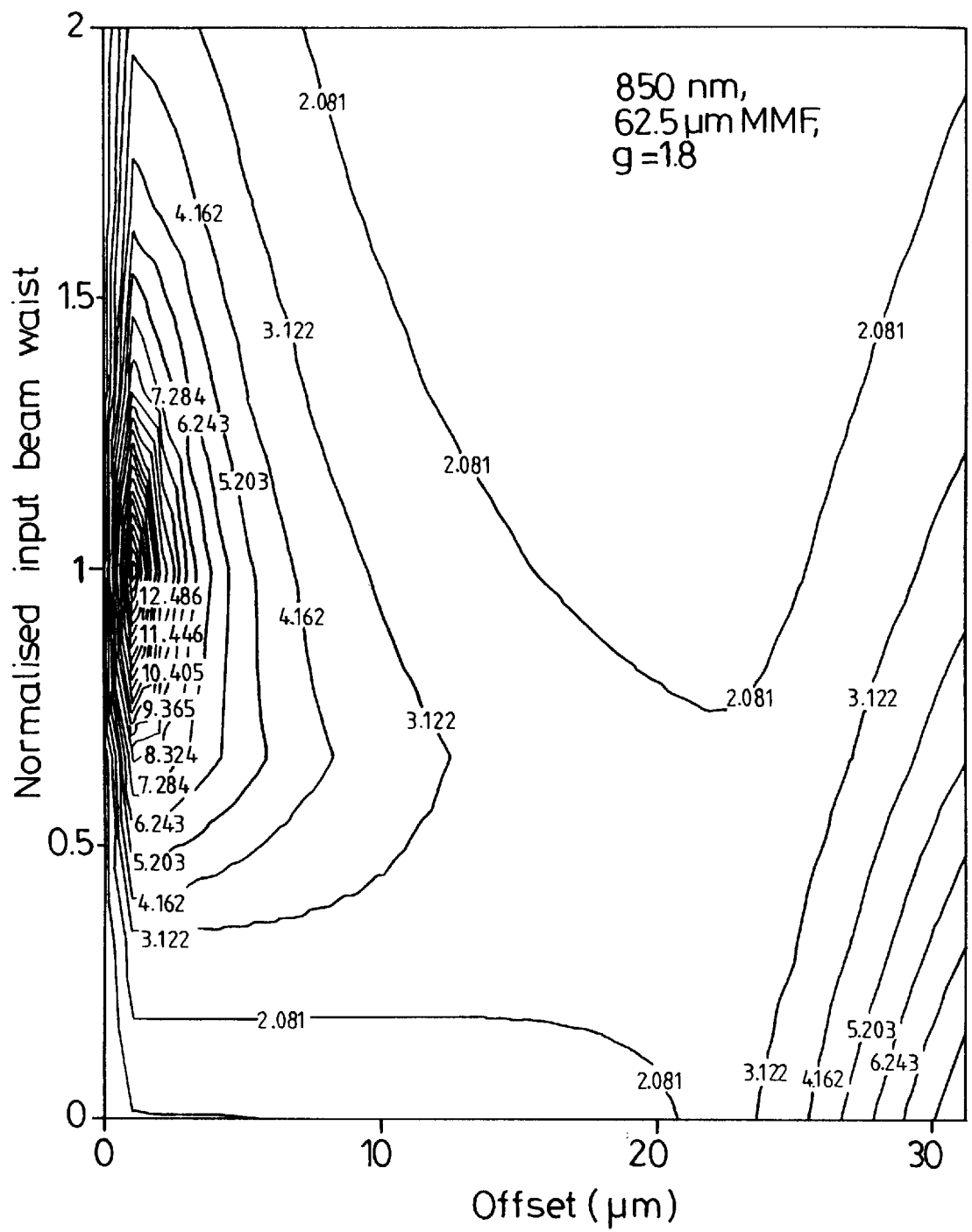
FIGS. 6, 7 and 8 are theoretical contour plots of the bandwidth gain (compared to an overfilled launch) due to an offset launch as a function of offset distance X and spot size r for respectively multimode fibres having g=1.8, 1.968 and 2.2.
Figure 7:
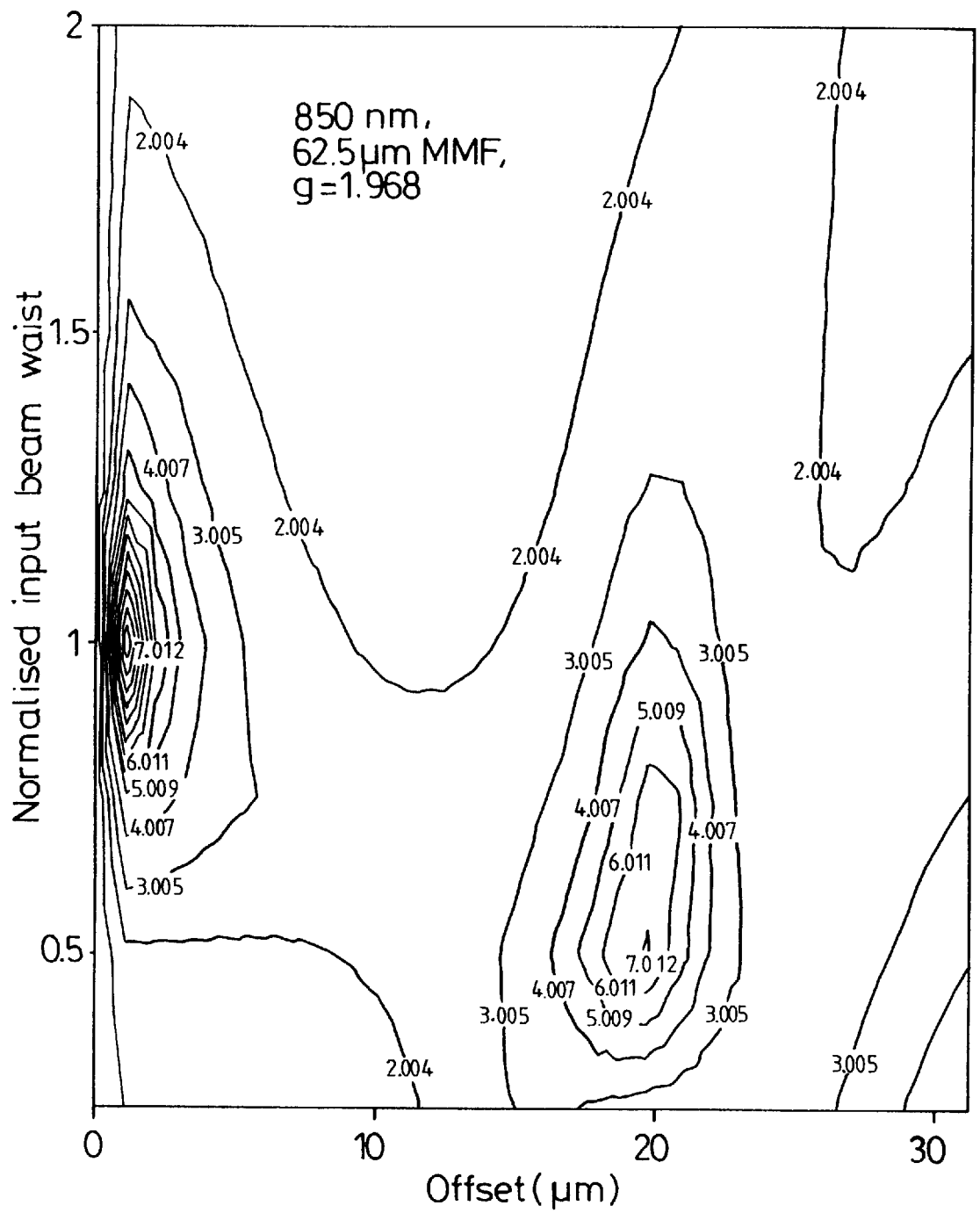
Figure 8:
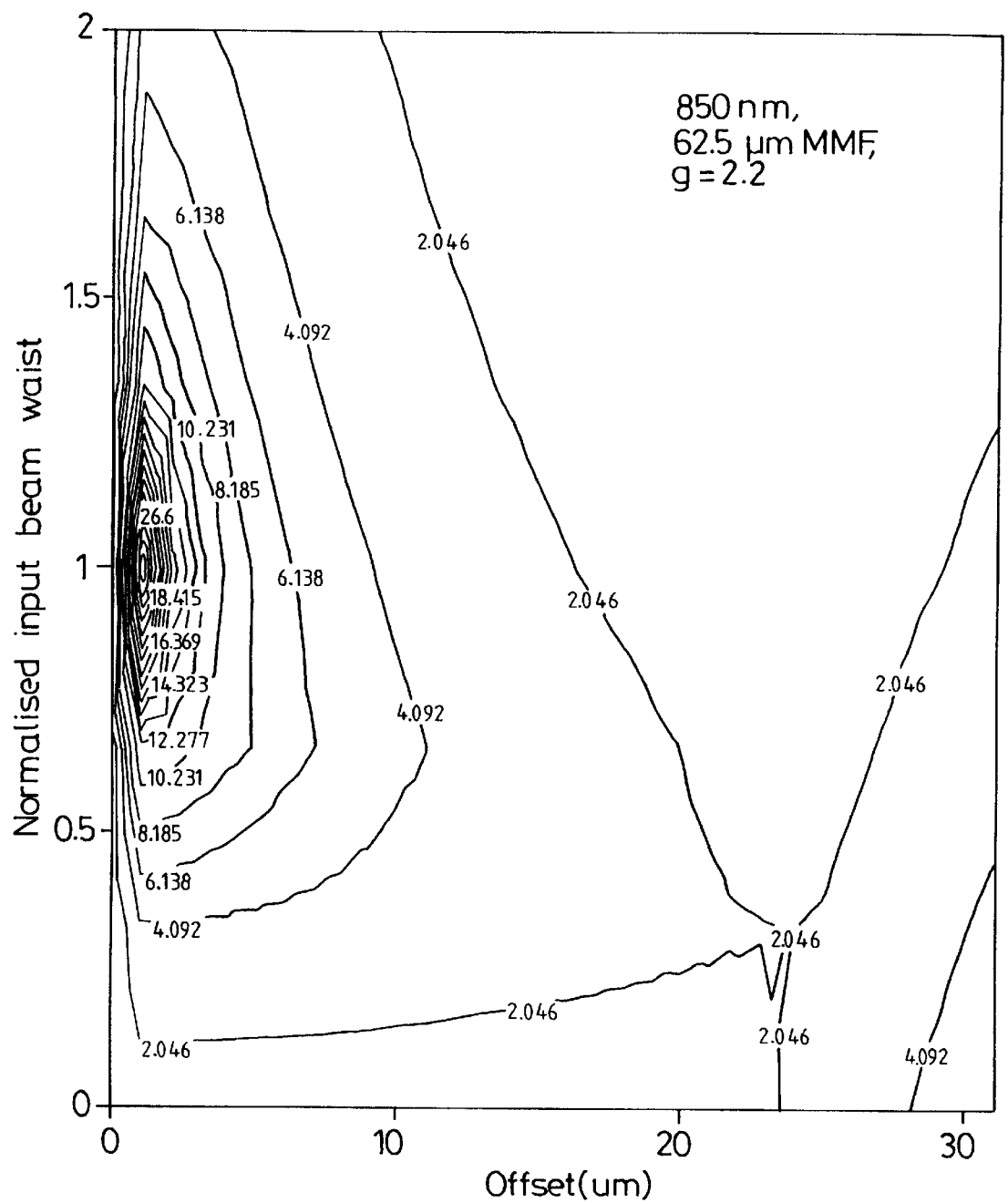

Contour graphs of the bandwidth gain compared to overfilled launch have been plotted for various values of g, offset and input beam waist (ie illuminating spot radius). The y axis of the contour plots is the source waist size normalized to $w_0$ ($w_0$ is lowest order mode waist size so that 1 on the y axis indicates a waist equal to the fundamental mode), the x axis is the launch offset in μm. Three contour plots are shown in FIGS. 6, 7 and 8. For all of the figures the wavelength is 850 nm and the fibre type is 62.5/125 μm. The three figures are for different values of the profile parameter with g values of 1.8, 1.968 and 2.2 in FIGS. 6, 7 and 8 respectively. These values were chosen to represent the two limits of g in modern fibre and also the value of g that gives the optimum overfilled launch bandwidth. Only the mappings of 850 nm and 62.5 μm fibre are shown. However, the mappings for all other combinations (850 nm/62.5 μm MMF, 1300 nm/62.5 μm MMF, 1300 nm/50 μm MMF) have been calculated and show similar features.

In all three Figures there is a sharp peak in the bandwidth gain when the launch spot is exactly at the centre and matched in size to the fundamental mode. This would launch only a single mode and therefore modal dispersion will be zero. It should be noted that due to a theoretical gain of ∞ at the peak, the graphing package has omitted the first column of data making it appear that the peak occurs slightly off centre instead of at the centre.

From these contours, it may seem that the centre launch provides spectacular bandwidth gains. However the analytical model used is based on square law media and it is therefore unable to determine the effects of defects in the fibre. Experimental evidence has shown that there might is advantage to offsetting the launch to overcome these defects. A second advantage in utilising an offset launch is the modal noise issue. A central launch minimising the number of modes in the fibre is expected to be near worst case for modal noise.

By offsetting the launch, the gain decreases from the peak but can remain significantly high. As the profile parameter g becomes close to optimum a second peak appears at an intermediate offset but there is also a deep trough between the offset peak and the mode matched gain peak. This trough in bandwidth gain is not a concern however since near the optimum g the OFL bandwidth is in any case quite high and therefore reduced relative bandwidth gain still results in a high absolute bandwidth.

From these contours an empirical relationship between input beam waist and offset in order to obtain optimum gain can be determined to be:

$$r \approx \omega_0 - (\omega_0/R)X$$

Where r is the input beam waist (or illuminating spot radius), $\omega_0$ is the $e^{-1}$ waist of the lowest order multimode fibre mode, R is the core radius and X is the offset from the core centre.

The degree to which defects or perturbations in the fibre affect the bandwidth enhancement has not been considered by the present theoretical model however work has been published showing that defects in the fibre can significantly affect fibre bandwidth (K. Yamashita, Y. Koyamada, and Y. Hatano, "Launching condition dependence of bandwidth in graded-index multimode fibers fabricated by MCVD or VAD method". *IEEE J. of Lightwave Tech.*, vol. 3, no. 3, June, 1985, pp. 601–607) and especially the bandwidth seen by centre launching (K. Suto and T. Kanada, "Dependence of error rate degradation on graded-index-fiber excitation state", *IEEE J. of Lightwave Tech.*, vol. 3, no. 6, December 1985, pp. 1324–1331). It is thus believed that the low bandwidth enhancement seen experimentally (and described below) is due to defects in the fibre refractive index profile.

Figure 9:
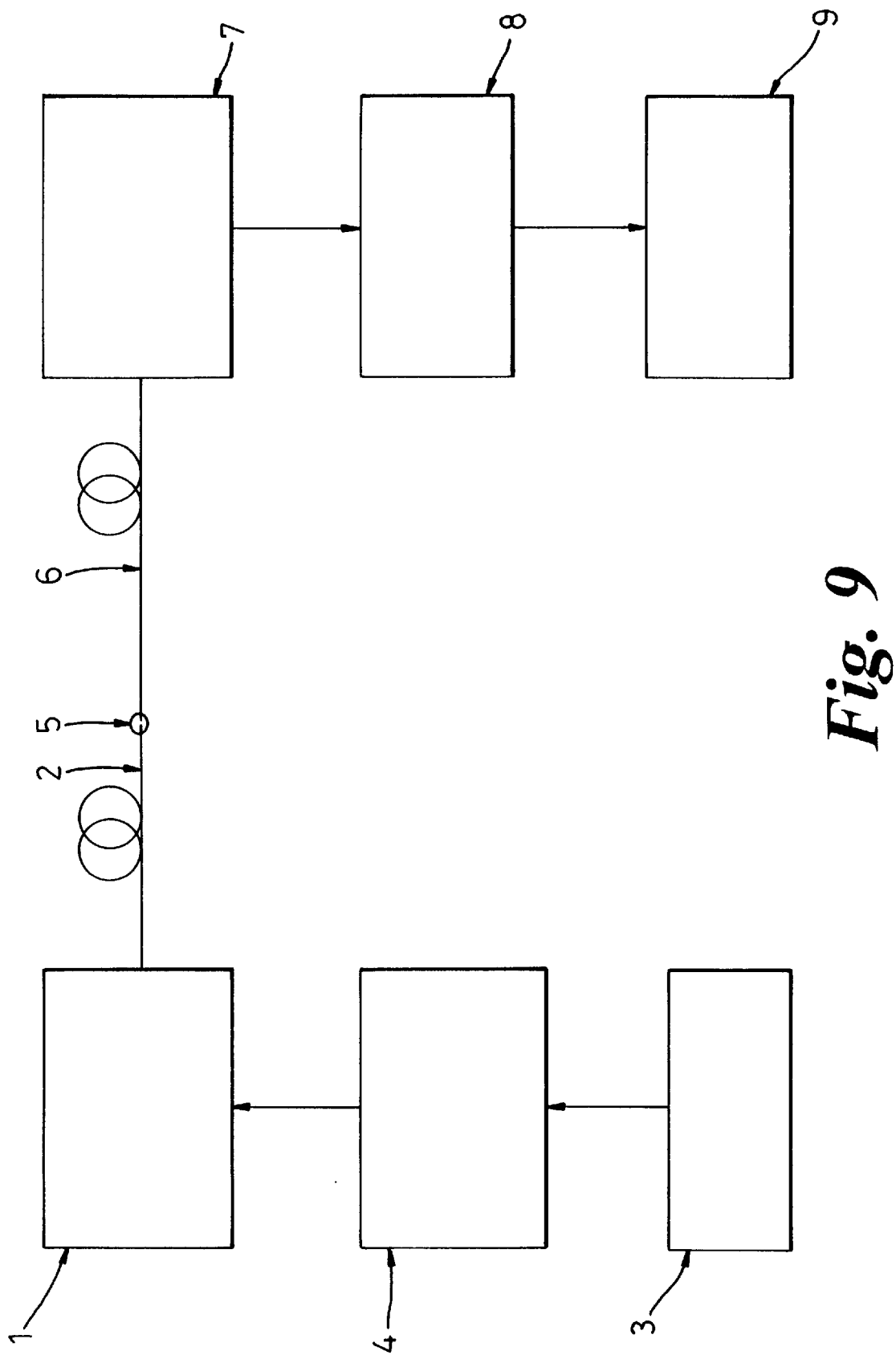
FIG. 9 shows an experimental configuration for demonstrating first and second embodiments of the present invention.
Figure 10:
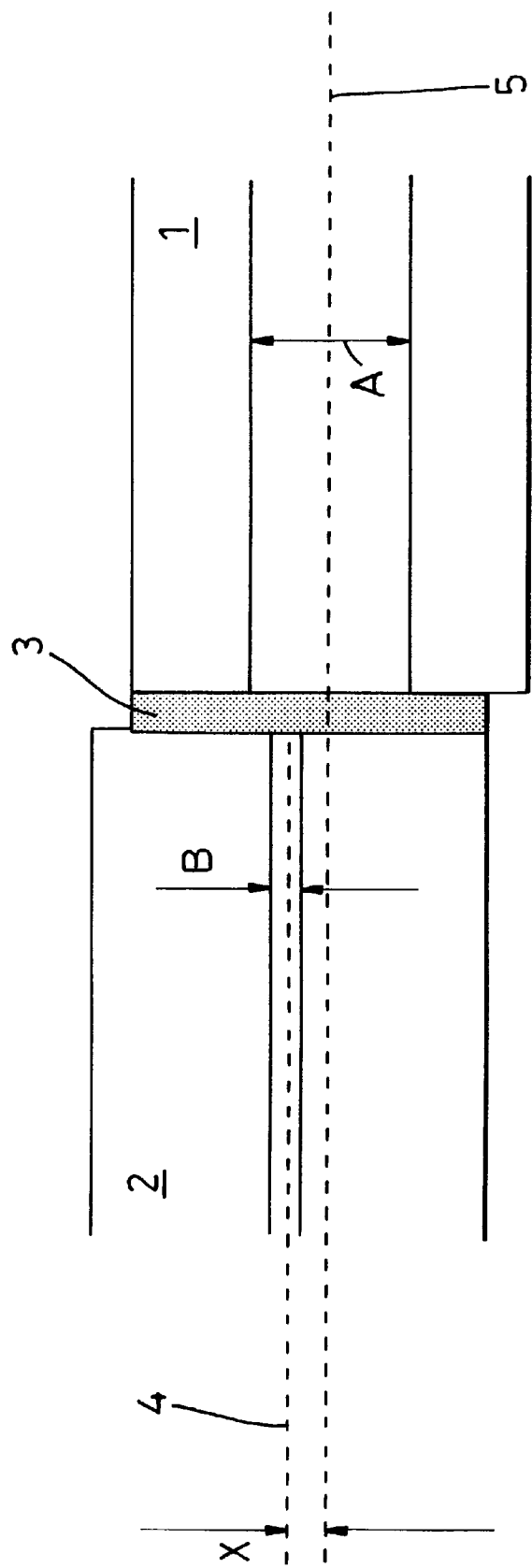
FIG. 10 is an enlarged portion, in cross-section, of the experimental configuration of FIG. 9.

A first embodiment of the present invention, utilising a singlemode optical fibre as the collecting means will now be described. With reference to FIG. 9 a singlemode optical source 1 comprises a 1300 nm Fabry Perot laser, coupled to a singlemode, 9 μm diameter, fibre pigtail 2. A data generator 3, operating at 1.0625 GBit/s feeds a data pattern to biasing and modulation circuitry 4, which drive the optical source 1. The singlemode fibre pigtail 2 is butt coupled at 5 to 2.2 km of 62.5/125 μm multimode fibre 6. The remote end of the multimode optical fibre 6 is connected to an optical receiver 7. The output of the optical receiver 7 is directed to clock and data recovery circuits 8 which recover the data pattern, and pass it to a sampling oscilloscope 9. FIG. 10 is an expanded drawing of the butt couple 5 between the singlemode fibre 2 and multimode fibre 6. It can be seen that the centre of the singlemode fibre core is offset axially from the centre of the multimode fibre core by a distance x.

Figure 11A:
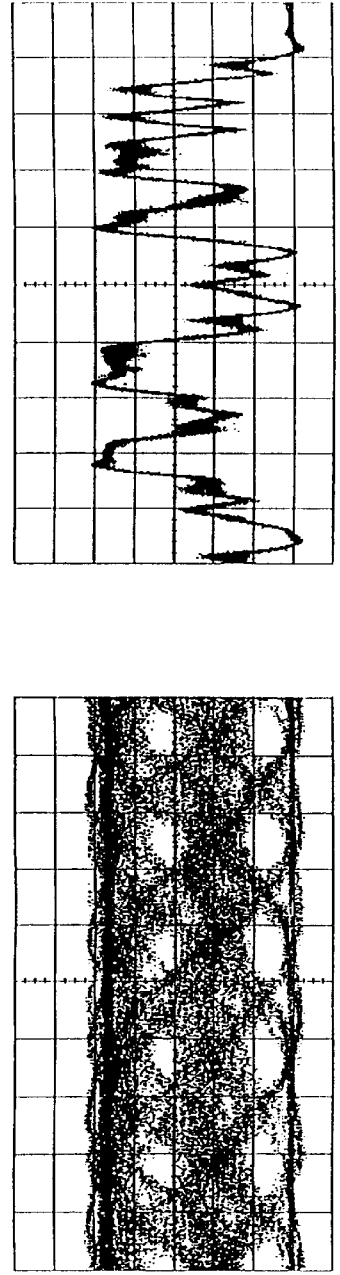
FIGS. 11a–e shows experimental results achieved with the experimental configuration of FIG. 9.
Figure 11B:
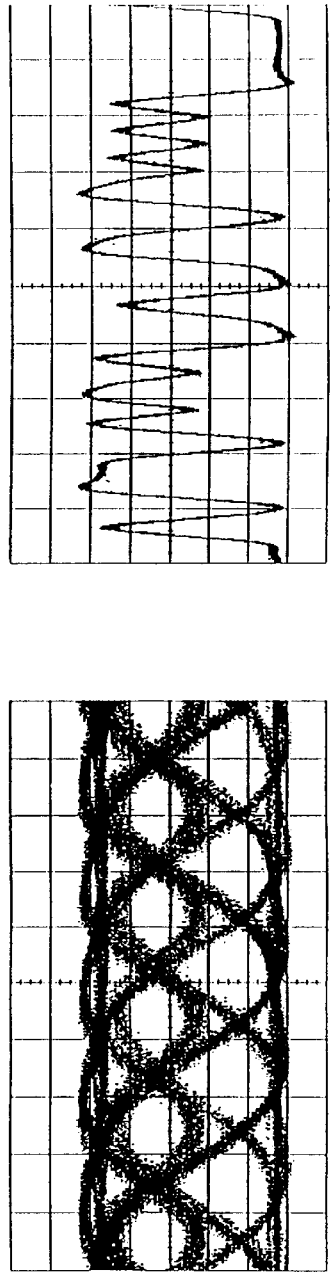
Figure 11C:
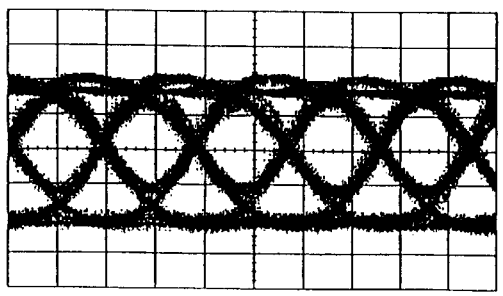
Figure 11C:
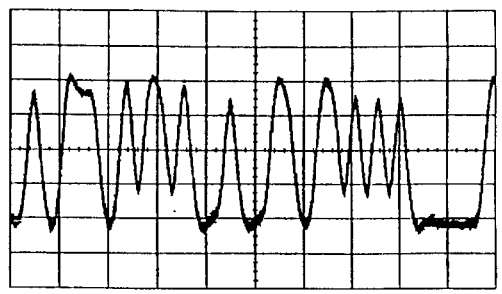
Figure 11D:
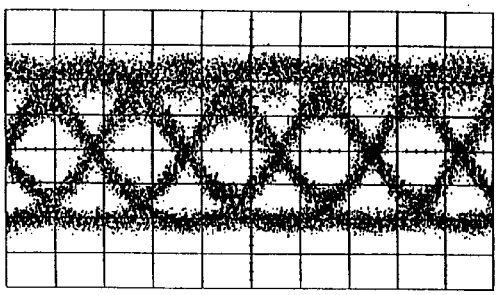
Figure 11D:
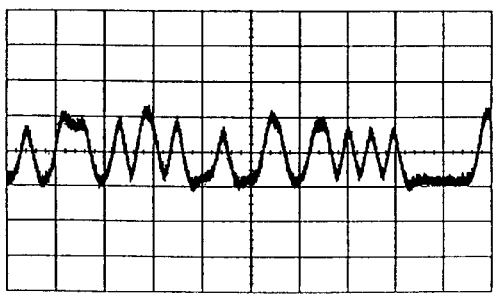
Figure 11E:
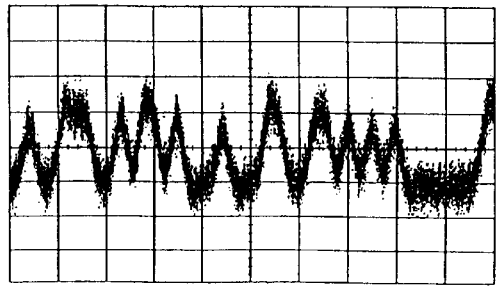
Figure 12A:
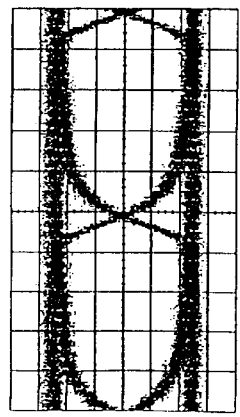
Figure 12B:
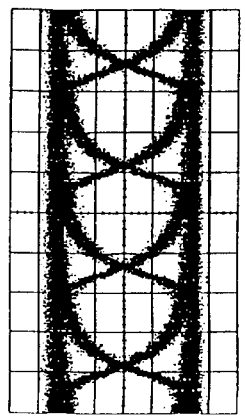

The multimode optical fibre 6 is standard graded index fibre, having a parabolic refractive index, and complying with ISO/IEC 793-2. The manufacturer's data for the bandwidth of this fibre (measured with an LED) is 500 MHz.km at 1.3 μm and 20° C. Thus this should limit transmission at 1 GBit/s to a length of 1 km at best, and more likely to 700 m when using conventional launch techniques. FIG. 11 shows the data pattern and eye diagram recorded at the sampling oscilloscope 9 for various offsets x between the singlemode fibre axis and the multimode fibre axis. From FIG. 11A it can be seen that for a conventional, on axis launch the eye diagram is indeed almost closed, after transmission through 2.2 km of multimode fibre, and the data pattern shows significant distortion. When the singlemode fibre 2 is offset from the axis of the multimode fibre 6 by 6.35 μm (corresponding to a ratio between the offset x and the multimode fibre core radius R of 0.2), it can be seen from FIG. 11B that the eye diagram has opened and the data pattern shows less distortion. From FIG. 11C, with an x/R ratio of 0.4 the eye diagram is almost fully open. At an $^x$/R ratio of 0.6 the eye diagram is still open, but significant noise is seen since the optical power reaching the optical receiver is much reduced. FIG. 11E shows the data pattern at an $^x$/R ratio of 0.8. The data pattern can still be recovered, but the optical signal level at the optical receiver 7 is now very low and significant noise is present. The optimum $^x$/R ratio, for a singlemode fibre with a core diameter of 9 μm launching 1.3 μm radiation into a multimode fibre having a core diameter of 62.5 μm, is approximately 0.5.

TABLE 1

| Offset $^x$/R | Average Launch Power (dBm) | Eye Height (V) |
| --- | --- | --- |
| 0 | −8.69 | 2.5 |
| 0.2 | −8.70 | 2.5 |
| 0.4 | −8.71 | 2.4 |
| 0.6 | −8.86 | 0.85 |
| 0.8 | −15.15 | 0.05 |

Table 1 shows the average launch power and the eye height for each of the $^x$/R ratios. From this it can be seen that significant loss is suffered at $^x$/R of 0.6 and 0.8. This is thought to be because the spot from the singlemode fibre 2 illuminates the end face of the multimode fibre 6 is too close to the edge of the core of the multimode fibre 6, causing lossy higher order modes, or cladding modes to be excited in the multimode fibre 6. However, at an $^x$/R ratio of 0.4 an extremely good eye diagram is received over 2.2 km of multimode fibre at 1.0625 GBit/s, and very little additional loss is suffered compared to a conventional centre launch ($^x$/R=0).

In order to further demonstrate the benefits of the present embodiment, a series of experiments were carried out in which the data rate of the data generator 3 was altered, and a comparison between three launch conditions was made. Firstly, the Fabry Perot laser described above was utilised with the singlemode fibre 2 axially aligned with the multimode fibre 6 ($^x$/R=0). Secondly, the same 1300 nm Fabry Perot laser was utilised with the singlemode optical fibre 2 offset by 15 μm from the axis of the multimode optical fibre 6 ($^x$/R=0.5). Thirdly, the 1.3 μm Fabry Perot laser was replaced by a 1.3 μm LED, which directly illuminated the multimode fibre 6. For all three launch arrangements the data generator 3 was stepped from 100 MBit/s to 700 MBit/s, in steps of 100 MBit/s. FIGS. 12A to 12E show the resulting eye diagrams.

Because the LED has a large light emitting area, and is directly butted to the multimode fibre 6, the LED will uniformly excite all modes of the multimode fibre 6. The symmetric, centre launch of the Fabry Perot laser will cause only a few low order modes of the multimode fibre to be excited. It is believed that the offset launch condition (asymmetrical launch) of the Fabry Perot laser causes a large number of modes to be excited, but relatively few lower order modes.

From FIG. 12 it can be seen that by 500 MGBit/s both the LED eye diagram, and the Fabry Perot centre launch eye diagram are showing significant closure, whereas the Fabry Perot offset launch eye diagram shows an insignificant degree of closure, and very little loss of received power compared to the centre launch configuration. By 700 MGBit/s the eye diagram for the LED is almost closed, that for the centre launch Fabry Perot is very poor, while that for the offset launch Fabry Perot is still fully open. Thus use of a launch configuration according to the present embodiment has increased the operational bandwidth of the multimode communications system significantly.

Figure 13:
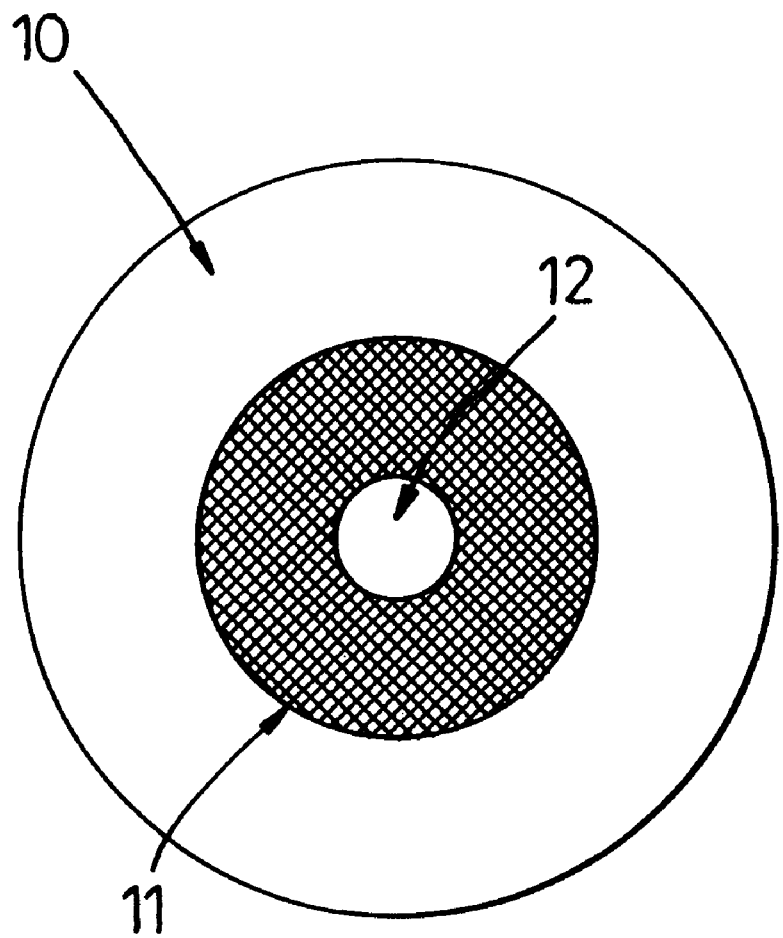
FIG. 13 is a schematic representation of collecting means according to a second embodiment of the present invention.

A second embodiment of the present invention will now be described with reference to FIG. 13 and FIG. 9. It has been found that the collecting means, the singlemode fibre 2, of the first embodiment can be replaced by a multimode fibre if the launch of optical radiation from the optical source 1 into the multimode fibre is controlled so as to excite only low order modes. FIG. 13 shows a cross-section of a launching multimode optical fibre 10, having a core 11. The launch of optical radiation from optical source 1 into launching multimode fibre 10 is controlled so as to achieve a small diameter output spot 12 from the multimode fibre 10 at the butt coupling point 5. In this embodiment this is achieved by the use of a single transverse mode optical source.

A third embodiment of the present invention will now be described, which utilises an optical lens as the collecting means to achieve an asymmetric launch.

Figure 14:
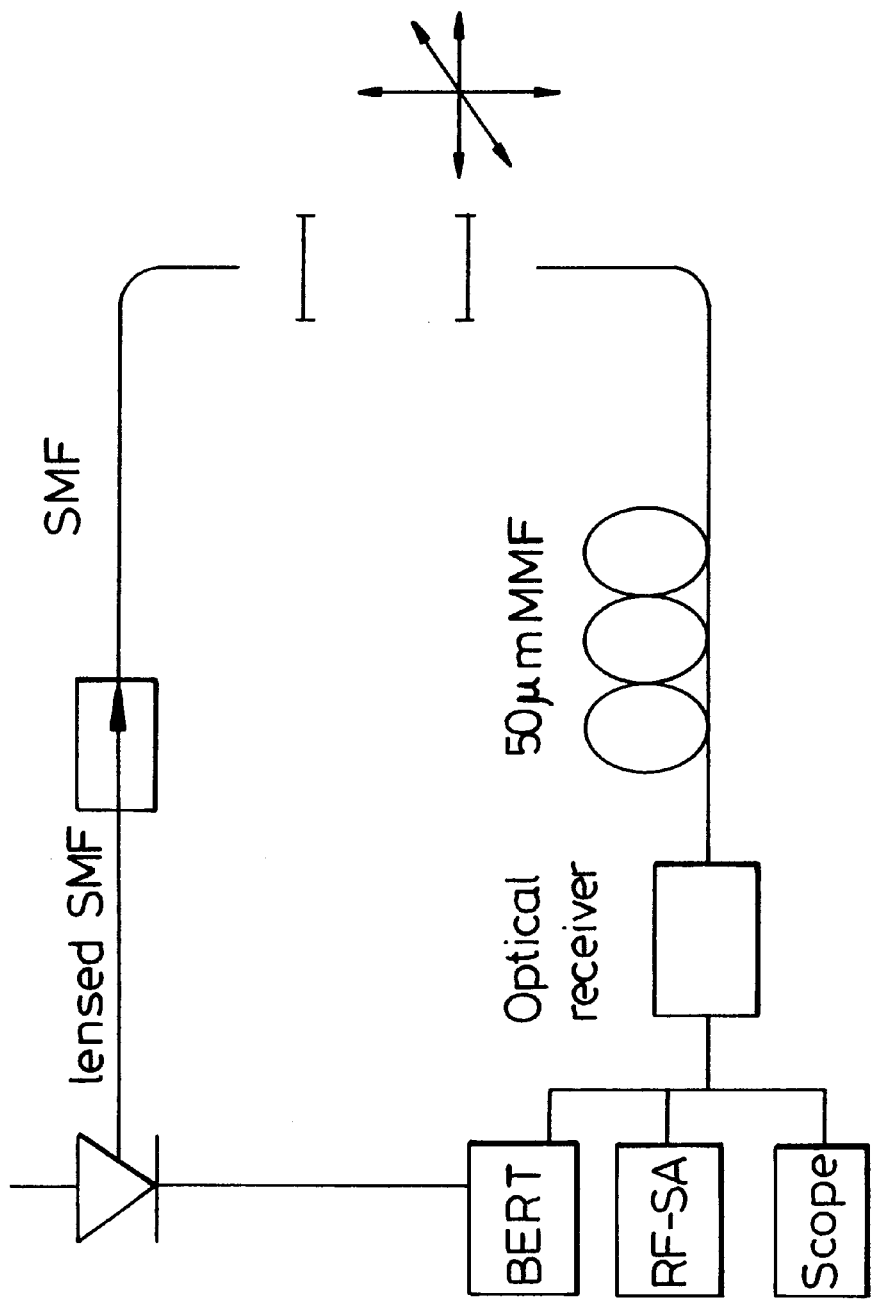
FIG. 14 is a schematic representation of an experimental configuration for demonstrating a third embodiment of the present invention.
Figure 15A:
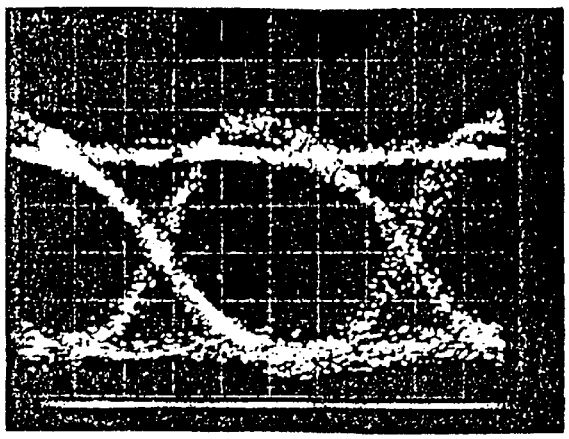
FIG. 15a–d shows experimental results achieved with the experimental configuration of FIG. 14, FIG. 16a and 16b show nearfield patterns of multimode fibres in accordance with the third embodiment of the present invention
Figure 15B:
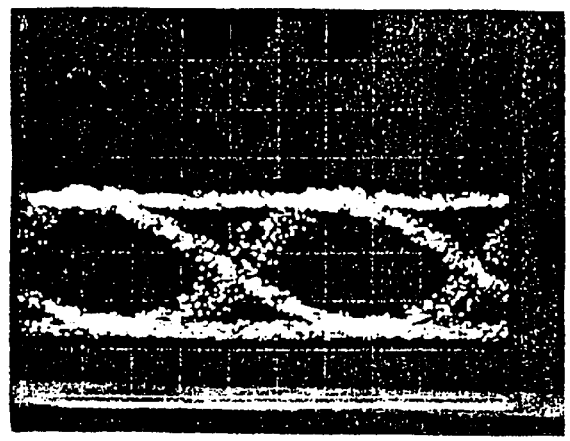
Figure 15C:
Figure 15D:
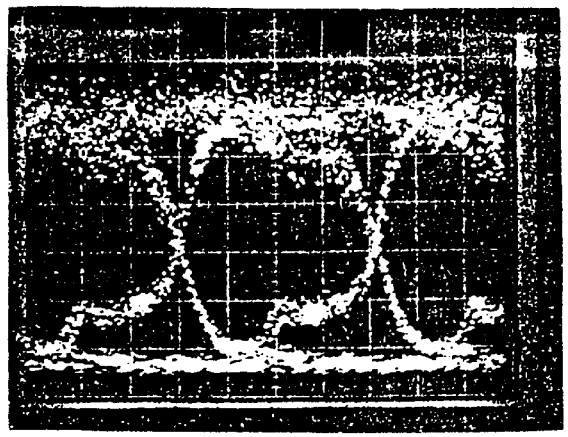

FIG. 14 shows the experimental setup. The laser diode used is an edge emitting Fabry-Perot device operating at 1.3 μm. This wavelength has been chosen since the specified bandwidth of MMF is higher, at 1.3 μm than at shorter wavelengths. The threshold current of the laser is around 65 mA, and no temperature control is used. For the transmission experiments, the laser is biased at 79 mA and modulated with a digital bit stream of 1.5 V p-p. The light from the laser is collected with a single mode fibre (SMF) with a lensed end and then fed through an optical isolator to eliminate feedback caused by the fibre-air interface. (The isolator will not be needed in a fully fiberised system.) Launching the light into the MMF is achieved using a collimating lens and a focusing lens (microscope objectives). Both the lenses are mounted on xyz-micropositioning stages. The MMF used is of 50/125 μm type, with lengths of 2 km (bandwidths 735

MHZ*km) and 1 km (bandwidth 657 MHZ*km). These 3 dB optical bandwidths have been measured using an LED source and an overfilled launch and agree closely with the bandwidths quoted by the manufacturer. The light is detected with a commercial detector with a MMF input which operates up to 2.4 GBit/s.

The bandwidth of the system is evaluated by observing the eye-diagram on an oscilloscope and by observing the RF-spectrum on a spectrum analyser. In accordance with the present embodiment the quality of the eye strongly depends on the alignment of the focusing lens relative to the MMF end. When the launching system is aligned to focus the light into the centre of the fibre, the bandwidth of the fibre link is approximately 450 MHZ over 2 km. If however, the light is launched near the edge of the fibre core, the bandwidth is approximately 1.7 GHz ( over 2 km), representing nearly a fourfold increase. The scope traces in FIG. 15 demonstrate the effect. With a link length of 3 km, acceptable eye-diagrams are obtained for data rates up to 2.4 GBit/s, the limit of the receiver.

Figure 16A:
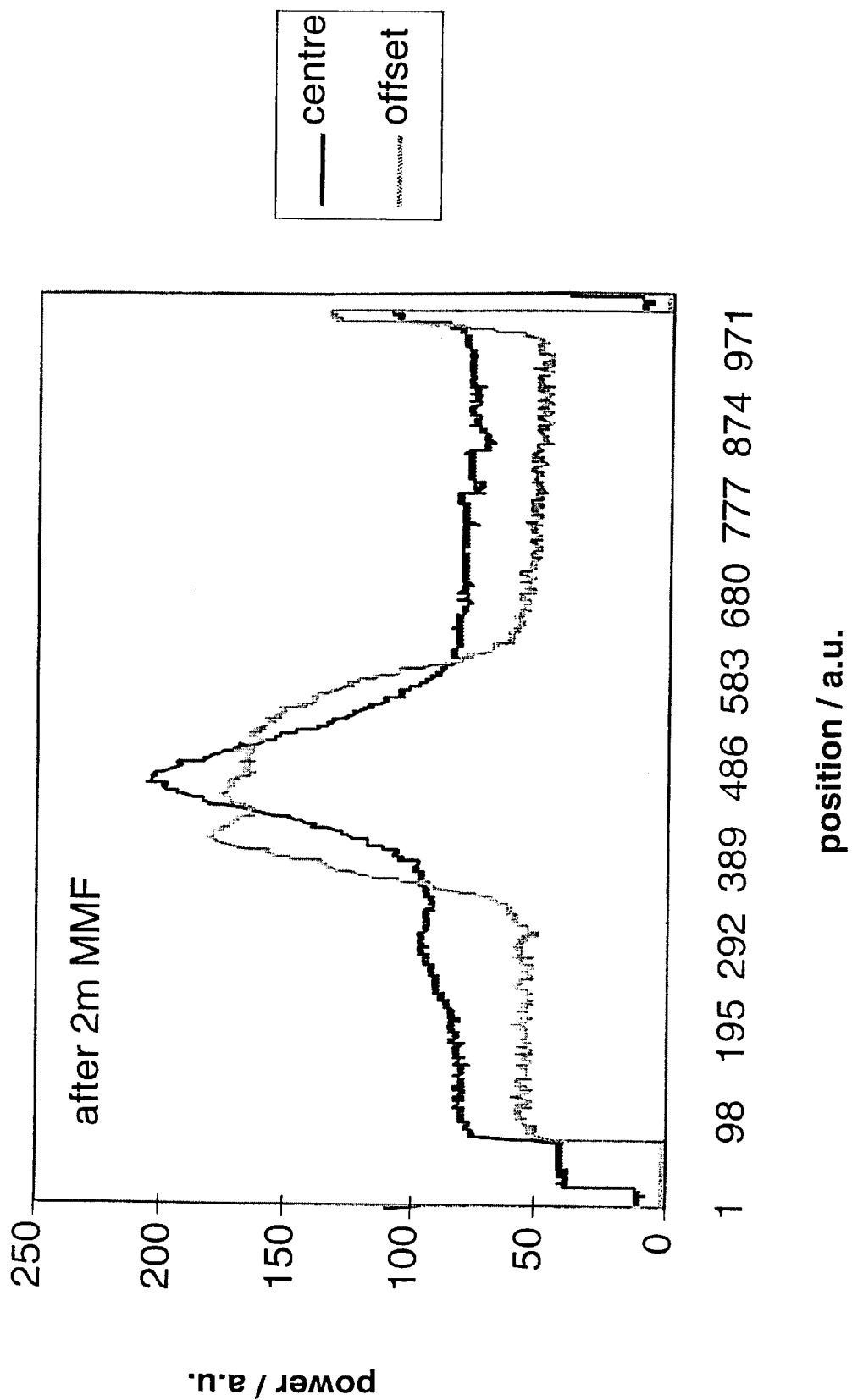
Figure 16B:
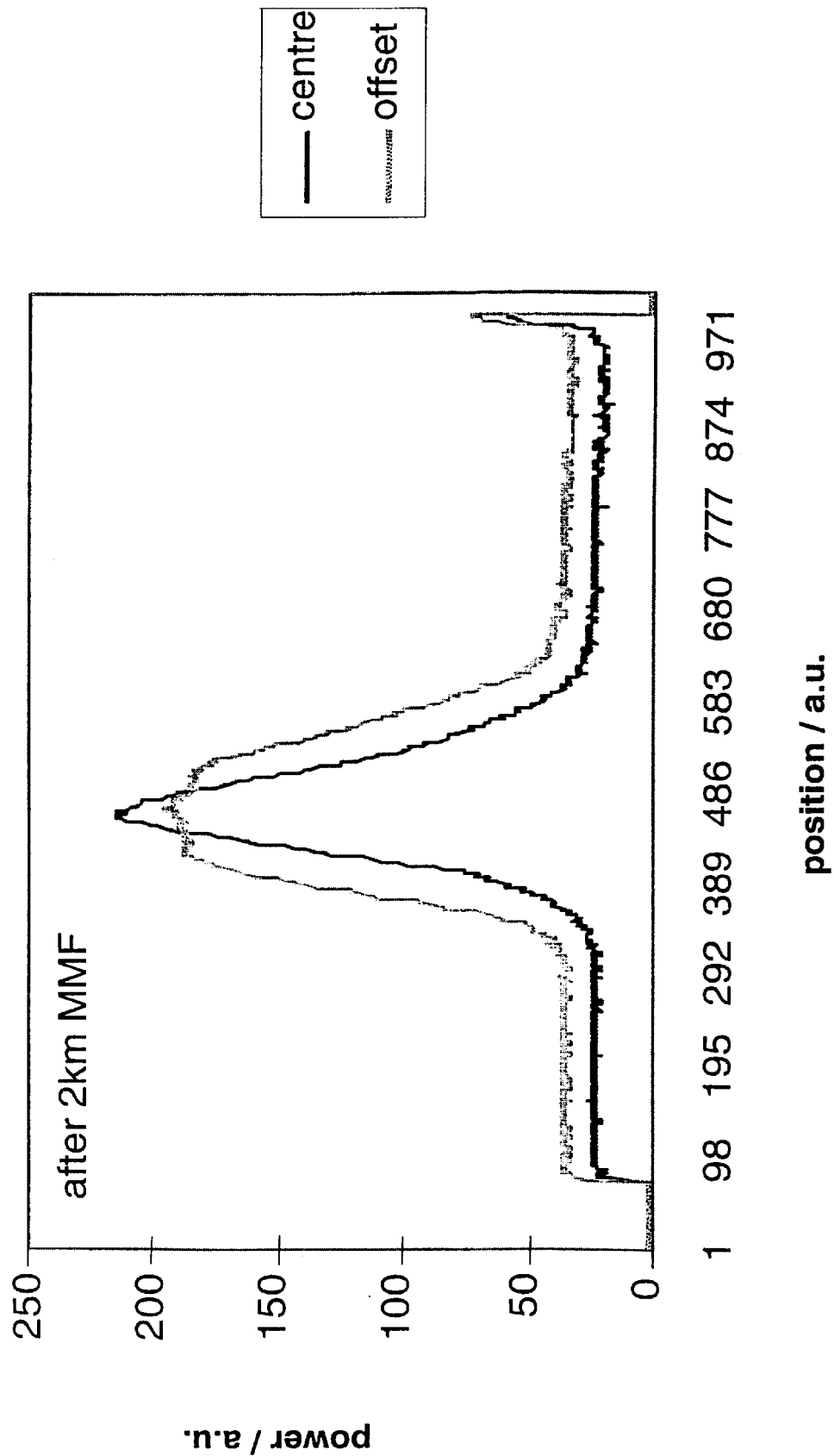

For the investigation of this effect, measurements of the fibre nearfield and the coupled-power-ratio (CPR) have been carried out. It is generally found that the highest bandwidth is achieved when the light is concentrated in the higher order modes (corresponding to a broad nearfield and a high value of CPR). In contrast, launching of the light into the centre of the MMF, which results in a much lower bandwidth, excites mainly modes located in the centre of fibre core, corresponding to a narrower nearfield pattern and low CPR values. FIG. 16 shows the nearfield patterns at the MMF end.

This behavior can be explained assuming that this launching technique can selectively excite sets of fibre modes with high (centre launch) and low (edge launch) modal dispersion.

The influence of the launching system is investigated by changing the collimating and focusing lenses (which determine spot size and NA) and measuring the bandwidth and CPR for the best and worst launch conditions. The table 2 summarises the findings. Note that the bandwidth values have estimated accuracies of 200 MHZ and that the highest bandwidth value of 1.76 GHz is limited by the receiver.

TABLE 2

Bandwidth and CPR values for a x10 collimating lens (the spot size values assume a spot size of 9 μm at the SMF end)

| launching | Spot | Bandwidth (2km)/GHz | | CPR/dB | |
|---|---|---|---|---|---|
| lens (mag./NA) | size/ μm | best (offset) | worst (centre) | best (offset) | worst (centre) |
| x40/0.65 | 3 | 1.76 | 0.45 | 20.2 | 7 |
| x16/0.32 | 5.8 | 1.76 | 0.45 | 24 | 5 |
| x10/0.25 | 9 | 1.76 | 0.45 | 19.6 | 6 |
| x2.5/0.07 | 23 | 1.76 | 0.45 | 13.5 | 7 |
| x1/0.05 | 39.1 | 1.0 | 0.45 | 14 | 7.4 |

It can be seen that a bandwidth improvement is obtained for a large range of lens combinations, which correspond to spot sizes at the MMF input from of 3 μm to 23 μm. The launching lens with the lowest NA, however, does not give a high bandwidth improvement.

As the launching lens is moved across the MMF input from the position that gives the lowest bandwidth (centre of the fibre) to the position with the best bandwidth, the coupled power decreases. With the x40 and x10 lenses, this decrease is less than 1.5 dB, whereas with the x2.5 lens it is about 4 dB.

Figure 17:
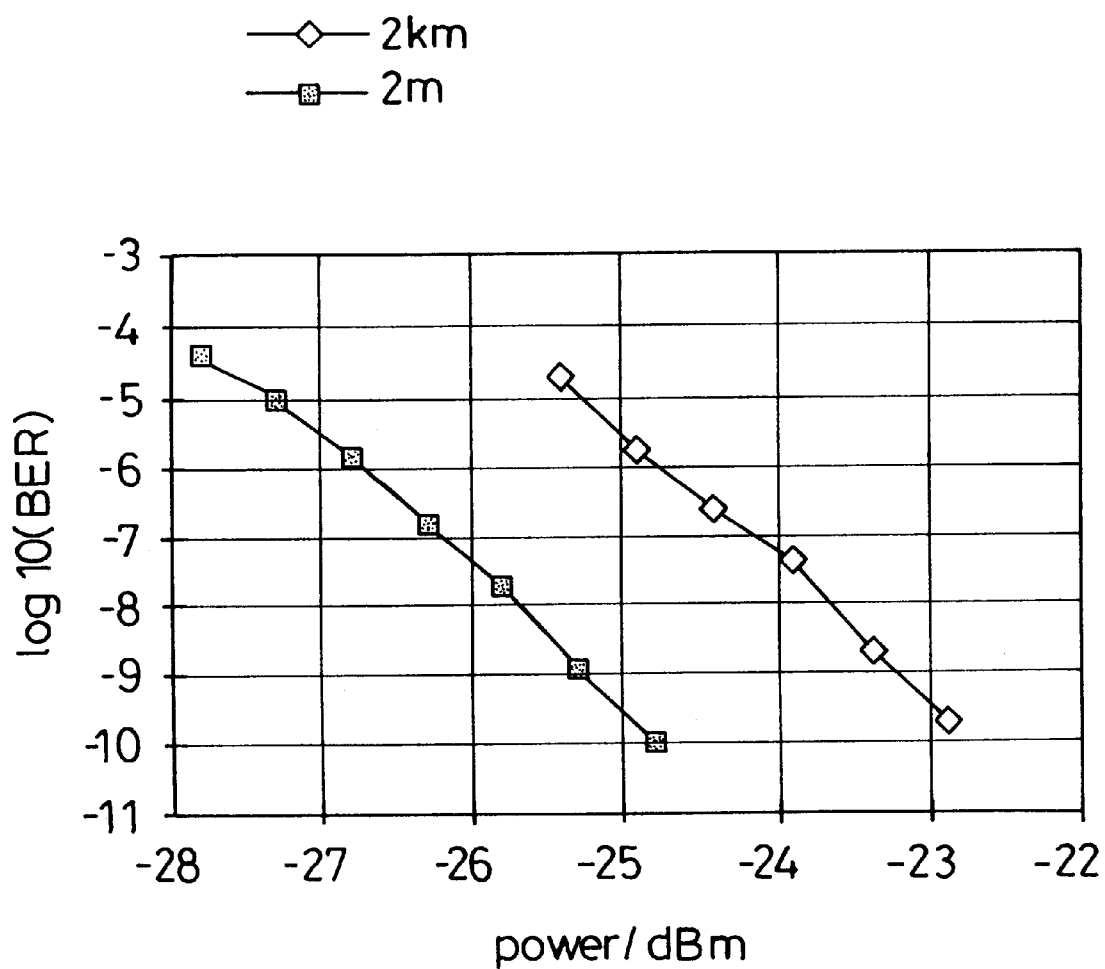
FIG. 17 shows bit error rare measurements of the experimental configuration of FIG. 14

Bit error rates have been measured for a 2 km link operating at 2 GBit/s. FIG. 17 shows a 2 dB penalty for this link compared to the back-back operation. Error free operation over one hour is also demonstrated.

Figure 18A:
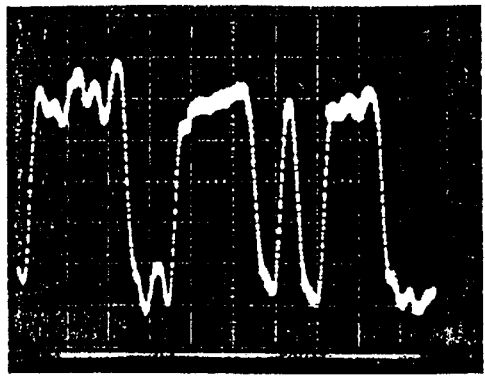
FIGS. 18a–c shows further experimental results utilising a VCSEL optical source with the configuration of FIG. 14.
Figure 18B:
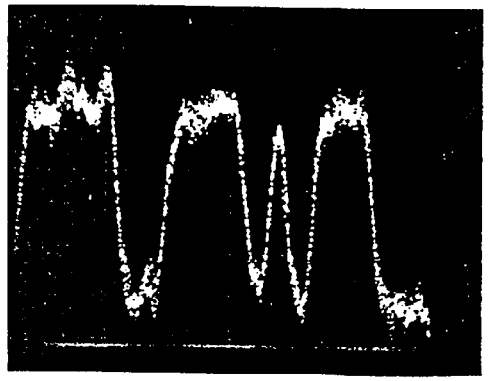
Figure 18C:
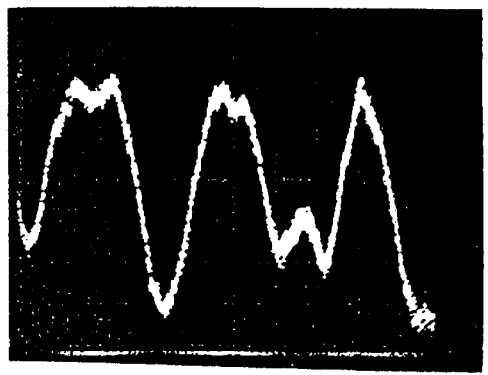

Preliminary experiments have been carried out using other light sources and fibre types. With an 850 nm VCSEL (HK2370B-D10-2), operating in a single transverse mode, the same bandwidth increasing effect is found when the light is focused off-centre at the MMF. The changes in the output after 2 km MMF (bandwidth 828 MHZ*km at 850 nm) are shown in FIG. 18. Under optimum launching conditions, the rise time is approximately 500 ps (rise time in back-back configuration is ~300 ps), whereas the centre-launch results in a rise time of ~1.5 ns. The performance of the VCSEL based system is currently limited by the characteristics of the laser (very small current range for single transverse mode operation) and the low receiver sensitivity.

The selective launch scheme has also been evaluated for 62.5 μm MMF. Using this fibre type (bandwidth 506 MHZ*km at 1300 nm) and a 1.3 μm laser, transmission of 1 GBit/s over 2.2 km is achieved. At 2 GBit/s an open eye is also obtainable, however at the expense of approximately 20 dB less coupled power.

Embodiments of the present invention increase the bandwidth of multimode fibre communications links significantly. By selectively exciting sets of fibre modes with low modal dispersion, bandwidth, enhancement of more than 400% can be achieved. Launching schemes according to the present invention operate with a range of fibre types and laser sources. Using a 1.3 μm laser diode, transmission of 2.4 Gbit/s over 3 km of 50/125 μm fibre is achieved, enabling multimode fibre to be employed for gigabit/s optical communications links.

APPENDIX—THEORETICAL MODEL

Approximately Square Law Fibres

Modem graded index multimode fibres are approximately square law media. The modal field distribution can therefore be modelled, at least to a first approximation, as the field distribution of the modes of a square law medium. In addition, it is well established that the WKB method can be used to calculate the delay time of the modes. For power law refractive index profiles simple analytical expressions for the delay exist, for example see D. Marcuse, *Light Transmission Optics*, 2nd Ed., Van Nostrand Reinhold, 1982.

Using the analytical expressions for the field distributions and the delay times it is possible to calculate the impulse RMS width of a multimode fibre. In addition, other relevant parameters such as the coupled power ratio may be estimated.

Modes of a Square Law Medium

The modes of a square law fibre may be calculated using Hermite polynomials, H(p,x) defined as:

$$H(p, x) = \sum_{m=0}^{\frac{p}{2}} \frac{(-1)^m p! (2x)^{(p-2m)}}{m!(p-2m)!}$$

where p is the mode index.

The total mode field distribution may then be expressed as the product of functions of x and y co-ordinates (x and y in plane of the fibre end face, z along axis of fibre) in accordance with J. Saijonmaa and S. J. Halme, "Reduction of modal noise by using reduced spot excitation", *Applied Optics*, vol. 20, no. 24, December 1981, pp. 4302–4306:

$$\chi(p, x, w_0) = \left(\frac{2}{\pi}\right)^{\frac{1}{4}} \cdot \left(\frac{1}{\sqrt{2^p \cdot p! \cdot w_0}}\right) \cdot H\left(p, \sqrt{2} \cdot \frac{x}{w_0}\right) \cdot e^{-\left(\frac{x}{w_0}\right)^2}$$

and $$\psi(q, y, w_0) = \left(\frac{2}{\pi}\right)^{\frac{1}{4}} \cdot \left(\frac{1}{\sqrt{2^q \cdot q! \cdot w_0}}\right) \cdot H\left(q, \sqrt{2} \cdot \frac{y}{w_0}\right) \cdot e^{-\left(\frac{y}{w_0}\right)^2}$$

where p and q are mode indices, $w_0$ is the $e^{-1}$ waist of the lowest order fibre mode given by $$w_0 = \left[\sqrt{\frac{2R}{\frac{2\pi n_1}{\lambda} \cdot \sqrt{2\Delta}}}\right]$$

where, $\lambda$ is the wavelength of the source.

A single transverse mode laser source may be modelled as a gaussian beam having an electric field distribution described by the following equations:

$$F_x(x, w_x, \delta) = \sqrt{\frac{2}{w_x \cdot \pi}} \cdot e^{-\frac{(x+\delta)^2}{w_x^2}}$$

$$F_y(y, w_y, \varepsilon) = \sqrt{\frac{2}{w_y \cdot \pi}} \cdot e^{-\frac{(y+\varepsilon)^2}{w_y^2}}$$

where $w_x$ and $w_y$ are the waists of the beam in the x and y directions, $\delta$ and $\epsilon$ are the offsets in the x and y axis from the centre of the fibre core.

The field excitation coefficients, $C(p,q,wo,wx,wy,\delta,\epsilon)$, may then be calculated from the overlap integral of the excitation field and the modal field distributions of the fibre:

$$C(p, q, w_0, w_x, w_y, \delta, \varepsilon) =$$
$$\int_{-\infty}^{\infty}\int_{-\infty}^{\infty} F_x(x, w_x, \delta) \cdot F_y(y, w_y, \varepsilon) \cdot \chi(p, x, w_0) \cdot \psi(q, y, w_0) dx\, dy$$

The double integral may be evaluated as the product of an integral over x multiplied by an integral over y so that:

$$C(p,q,w_0,w_x,w_y,\delta,\epsilon) = C_p(p,w_0,w_x,\epsilon) \cdot C_q(q,w_0,w_y,\epsilon)$$

Evaluation of the integral results in the following solutions:

$$C_p(p, w_0, w_x, \delta) = \sqrt{\frac{2}{w_x \cdot w_0}} \cdot \frac{1}{2^{\left(\frac{p}{2}\right)} \cdot \sqrt{p!}} \cdot \frac{w_x w_0}{\sqrt{w_x^2 + w_0^2}} \cdot$$
$$\left(\frac{w_0^2 - w_x^2}{w_x^2 + w_0^2}\right)^{\frac{p}{2}} \cdot H\left[p, \frac{\sqrt{2} \cdot \delta}{\sqrt{w_0^4 - w_x^4}}\right] \cdot e^{-\left(\frac{\delta^2}{w_x^2 + w_0^2}\right)}$$

and $$C_q(q, w_0, w_y, \varepsilon) = \sqrt{\frac{2}{w_y \cdot w_0}} \cdot \frac{1}{2^{\left(\frac{q}{2}\right)} \cdot \sqrt{q!}} \cdot \frac{w_y w_0}{\sqrt{w_y^2 + w_0^2}} \cdot$$
$$\left(\frac{w_0^2 - w_y^2}{w_y^2 + w_0^2}\right)^{\frac{q}{2}} \cdot H\left[q, \frac{\sqrt{2} \cdot \varepsilon}{\sqrt{w_0^4 - w_y^4}}\right] \cdot e^{-\left(\frac{\varepsilon^2}{w_y^2 + w_0^2}\right)}$$

The power coupling per mode, $PC(p,q,w_0,w_x,w_y,\delta,\epsilon)$, may then be calculated to be:

$$PC(p,q,w_0,w_x,w_y,\delta,\epsilon) = (C_p(p,w_0,w_x,\epsilon) \cdot C_q(q,w_0,w_y,\epsilon))^2$$

Modal Propagation Times

According to the WKB method, the modal propagation time, $\tau(g,p,q)$, for power law fibres may be calculated as $$\tau(g, p, q) = \left(\frac{n_1 \cdot L}{c}\right) \cdot \frac{1 - \frac{4 \cdot \Delta}{g+2} \cdot \left(\frac{M(p,q)}{N(g)}\right)^{\frac{g}{g+2}}}{\left[1 - 2 \cdot \Delta \cdot \left(\frac{M(p,q)}{N(g)}\right)^{\frac{g}{g+2}}\right]^{0.5}}$$

where, L is the fibre length, c the speed of light, g the power law of the refractive index curve, $M(p,q) = (p+q+1)^2$ and $N(g)$ the total number of guided modes $$N(g) = \frac{g}{g+2}\left(n_1 \frac{2\pi}{\lambda} R\right)^2 \Delta$$

The RMS width of the impulse response of the fibre may then be calculated according to R. Olshansky and D. B. Keck, "Pulse broadening in graded-index optical fibers", *Applied Optics*, vol. 15, no. 2, February 1976, pp. 483–491, as:

$$\sqrt{\sum_p \sum_q PC(p, q, w_0, w_x, w_y, \delta, \varepsilon) \cdot \tau(g, p, q)^2 - (mean\_delay)^2}$$

where the total power is normalised to one. It should be noted that this model does not include other dispersion effects since modal dispersion predominates.

Coupled Power Ratio Due To Single Mode Launch

The EIA/TIA has proposed that the ratio of the optical power captured by a single mode fibre to that captured by a multimode fibre at the output of a multimode fibre under test be used to characterize the modal excitation of the test multimode fibre. The ratio is called the Coupled Power Ratio (CPR) and it may be calculated.

The coupled power per mode observed at the output of a multimode fibre that has been excited by a single transverse mode source may be calculated to be $CP(p,q,w_0,w_x,w_y,\delta,\delta_1,\epsilon,\epsilon_1)$:

$$CP(p,q,w_0,w_x,w_y,\delta,\delta_1,\epsilon,\epsilon_1) = (C(p,q,w_0,w_x,w_y,\delta,\epsilon) \cdot C(p,q,w_0,w_x,w_y,\delta_1,\epsilon_1))^2$$

where, $\delta$, $\epsilon$ and $\epsilon_1$, $\delta_1$ are the offsets of the input single mode source and the sampling single mode fibre in x and y directions respectively.

If $\epsilon$ and $\epsilon_1$ are set to zero the CPR in dB is then:

$$CPR(w_0, w_x, w_y, \delta, \delta_1) = 10\log \sum_p \sum_q CP(p, q, w_0, w_x, w_y, \delta, \delta_1, 0, 0)$$

Fibre Refractive Index Profiles

The refractive index profiles in modern graded index fibres used for data communication applications follow approximately a power law where the refractive index is defined as:

$$n(r) = \begin{array}{ll} n_1\left(1 - 2\Delta\left(\frac{r}{R}\right)^g\right)^{0.5} & r < R \\ n_2 & r \geq R \end{array}$$

where $n_1$ is the core refractive index, $n_2$ is the cladding refractive index, r is the radius, R is the core radius, g is the profile parameter and $\Delta=(n_1^2-n_2^2)/2n_1^2$ is the relative refractive index difference between core and cladding. The optimum profile for minimal modal dispersion is $g\approx2$. All modern fibre is designed to be as close to optimum as possible but the actual range can be as much as 1.8<g<2.2. Perturbations in the refractive index can occur. Defects at the core/cladding interface, changing profile parameter g as a function of radius or a central index dip have all been reported by workers in this field. The central index dip is probably the most severe defect and can occur during the collapsing of the preform in the manufacture of the fibre. The probability of the existence of this dip in modern fibre is not clear.

We claim:

1. A method of increasing the operational bandwidth of a multimode fibre communication system, the method comprising launching optical radiation through a collecting multimode fibre aligned to a source of coherent optical radiation such that only low order modes of the collecting multimode fibre are excited into a core of a conducting multimode fibre away from the centre of the core so as to strongly excite mid order modes of the conducting multimode fibre, but to only weakly excite low order and high order modes of the conducting multimode fibre.

2. A transmitter for use in a multimode fibre communications system, the transmitter comprising an optical source which is a source of coherent optical radiation, and a collecting multimode fibre for collecting optical radiation output from the optical source and directing it to an end face of a conducting multimode optical fibre, wherein the collecting multimode fibre is aligned to the optical source so that only low order modes of the collecting multimode fibre are excited, and wherein the collecting multimode fibre is adapted to direct optical radiation into a core of a conducting multimode fibre substantially away from the optical axis of the conducting multimode fiber core so as to increase the operational bandwidth of the multimode fibre communications system by strongly exciting mid order modes of the conducting multimode fibre, but only weakly exciting low order and high order modes of the conducting multimode fibre.

3. A transmitter as claimed in claim 2, wherein the optical source is a laser.

4. A transmitter as claimed in claim 2, wherein the collecting means is adapted to illuminate the core of the conducting multimode fibre with a substantially circular spot of radiation of radius r.

5. A transmitter as claimed in claim 4, wherein the radius of the spot r is such that $r/R \leq \frac{1}{2}$ where R is the radius of the core of the conducting multimode fibre.

6. A transmitter as claimed in claim 5, wherein $r/R \leq \frac{1}{4}$.

7. A transmitter as claimed in claim 4, wherein $r \leq 10\lambda$, where $\lambda$ is the wavelength of the optical radiation output from the optical source.

8. A transmitter as claimed in claim 4, wherein the distance of the centre of the spot of the centre of the core of the conducting multimode fibre, x is such that: $0.1 \leq x/R \leq 0.9$.

9. A transmitter as claimed in claim 8, wherein $0.5 \leq x/R \leq 0.7$.

10. A transmitter as claimed in claim 8, wherein x/R is substantially equal to one half.

11. A transmitter as claimed in claim 4 wherein $r \approx \omega o - (\omega o/R)X$ where $\omega o$ is the $e^{-1}$ waist of the lowest order mode of the conducting multimode fibre.

12. An optical communications system comprising a transmitter as claimed in claim 3, a length of multimode optical fibre, and a receiver.

13. A transmitter for use in a multimode fibre communications system, the transmitter comprising an optical source which is a vertical cavity surface emitting laser, and a collecting element for collecting optical radiation output from the optical source and directing it to an end face of a multimode optical fibre, wherein the collecting element is adapted to direct optical radiation onto a core of the multimode fibre substantially away from an optical axis of the multimode fibre core so as to increase operational bandwidth of the multimode fibre communications system by strongly exciting mid order modes of the multimode fibre, but only weakly exciting low order and high order modes of the multimode fibre.

14. A transmitter for use in a multimode fibre communications system, the transmitter comprising an optical source which is a source of coherent optical radiation and a collecting element for collecting optical radiation output from the optical source and directing it to an end face of a multimode optical fibre, wherein the collecting element is adapted to direct optical radiation onto the core of the multimode fibre substantially away from an optical axis of the multimode fibre core such that the optical radiation is incident on the multimode fibre core as an annulus of radiation surrounding the centre of the core, so as to increase operational bandwidth of the multimode fibre communications system by strongly exciting mid-order modes of the multimode fibre but only weakly exciting low order and high order modes of the multimode fibre.

* * * * *